United States Patent

Brug et al.

[11] Patent Number: 5,930,087
[45] Date of Patent: Jul. 27, 1999

[54] ROBUST RECORDING HEAD FOR NEAR-CONTACT OPERATION

[75] Inventors: James A. Brug, Menlo Park; Manoj K. Bhattacharyya, Cupertino; Lung T. Tran, Saratoga; Thomas C. Anthony, Sunnyvale, all of Calif.

[73] Assignee: Hewlett-Packard Company, Palo Alto, Calif.

[21] Appl. No.: 08/974,420

[22] Filed: Nov. 20, 1997

[51] Int. Cl.$^6$ .................................................. G11B 5/33
[52] U.S. Cl. ............................................ 360/113; 360/126
[58] Field of Search ..................................... 360/113, 126, 360/127; 257/421

[56] References Cited

U.S. PATENT DOCUMENTS

| | | | |
|---|---|---|---|
| 5,629,922 | 5/1997 | Moodera et al. | 360/113 X |
| 5,695,864 | 12/1997 | Slonczewski | 360/113 X |
| 5,747,859 | 5/1998 | Mizushima et al. | 360/113 X |
| 5,757,056 | 5/1998 | Chui | 257/421 |
| 5,801,984 | 9/1998 | Parkin | 365/158 |

*Primary Examiner*—John H. Wolff

[57] ABSTRACT

A robust recording head with a spin tunneling sensing element separated from an interface between the recording head and a recording media so as not to be affected by collisions and other ill effects at the interface between the recording head and the recording media. The spin tunneling sensing element includes a pair of magnetic elements wherein one of the magnetic elements functions as a flux guide that conducts magnetic flux emanating from the recording media away from the interface to an active area of the spin tunneling sensing element.

18 Claims, 2 Drawing Sheets

ROBUST RECORDING HEAD FOR NEAR-CONTACT OPERATION

BACKGROUND OF THE INVENTION

1. Field of Invention

The present invention pertains to the field of recording heads. More particularly, this invention relates to a robust recording head suitable for near contact operations with recording media.

2. Art Background

Recording media such as magnetic tape and disk are commonly used in a wide variety of information storage applications. Such a recording media is usually constructed of a magnetically alterable material that is capable of emanating a magnetic field or flux that varies along its surface according to the content of the information stored on the recording media. Such a recording media is typically subdivided into storage areas or transitions. Typically, the storage density of a recording media increases as the surface dimensions of the storage areas on the recording media decreases.

Information is usually read from such recording media with a recording head that is positioned near the recording media as the recording media moves with respect to the recording head. A recording head typically includes a sensing element that senses the magnetic flux emanating from the recording media. Typically, the resistivity of the sensing element changes in response to the magnetic flux emanating from the recording media. A sensing element that changes resistivity in response to a magnetic field is usually referred to as a magneto-resistive sensing element.

Prior magneto-resistive sensing elements typically include one or more ferromagnetic elements whose resistivity changes in response to magnetic flux. Prior magneto-resistive sensing elements include anisotropic sensing elements in which a sense current flows along planes of the ferromagnetic elements. Prior magneto-resistive sensing elements also include spin tunneling sensing elements in which a sense current flows perpendicular to the planes of the ferromagnetic elements through a dielectric barrier.

The sensing element in prior recording heads, whether anisotropic or spin tunneling, is usually positioned near the interface between the recording head and the recording media where the intensity of the magnetic flux being sensed is greatest. Typically, a recording head and its sensing element must be positioned in near contact with the recording media in order to sense weak magnetic fields and in order to differentiate among different storage areas of a high density recording media.

Collisions can occur between the recording head and the recording media during such near contact operations, particulary with removable recording media. Such collisions can result in deformation of the sensing element which is typically located near the interface to the recording media. Unfortunately, such deformation can change the finely tuned magnetic properties of the sensing element and reduce the sensitivity of the sensing element to the magnetic flux emanating from the recording media. Such wear to the sensing element can reach a point where the recording head can no longer reliably read the recording media. Collisions between the recording media and the sensing element can also introduce thermal spikes into the sensing element. Unfortunately, such thermal spikes usually cause a variation in the resistivity of the sensing element, thereby introducing noise into the read operation.

In addition, prior recording heads having a sensing element positioned near the interface to the recording media are subject to a variety of other ill effects. For example, such a sensing element is often subject to damage from corrosion that occurs near the interface to the recording media. Moreover, recording heads having a sensing element near the recording media typically include conductors which are placed near the interface to the recording media. This can result in corrosion and smearing effects and can result in short circuits between the conductors and the shields of the recording head.

Furthermore, resistivity changes in a typical prior sensing element usually gives rise to a voltage potential on the sensing element. Such a potential on the sensing element may result in an electrical short circuit between the sensing element and the shield of a prior recording head. The potential difference between the sensing element the shield can also cause a potential difference between the sensing element and the recording media which can cause read noise in the sensing element.

SUMMARY OF THE INVENTION

A robust recording head is disclosed that reduces problems associated with collisions and other ill effects that occur at the interface between the recording head an a recording media during near contact operations. The recording head employs a spin tunneling sensing element which is separated from the interface between the recording head and the recording media so as not to be affected by collisions and other ill effects at the interface between the recording head and the recording media. The spin tunneling sensing element includes a magnetic element that functions as a flux guide to conduct magnetic flux emanating from the recording media away from the interface to an active area of the spin tunneling sensing element. The structure of the robust recording head does not expose conductors for the sensing element to the recording media and prevents short circuits from forming between the flux guide and the recording head shields.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
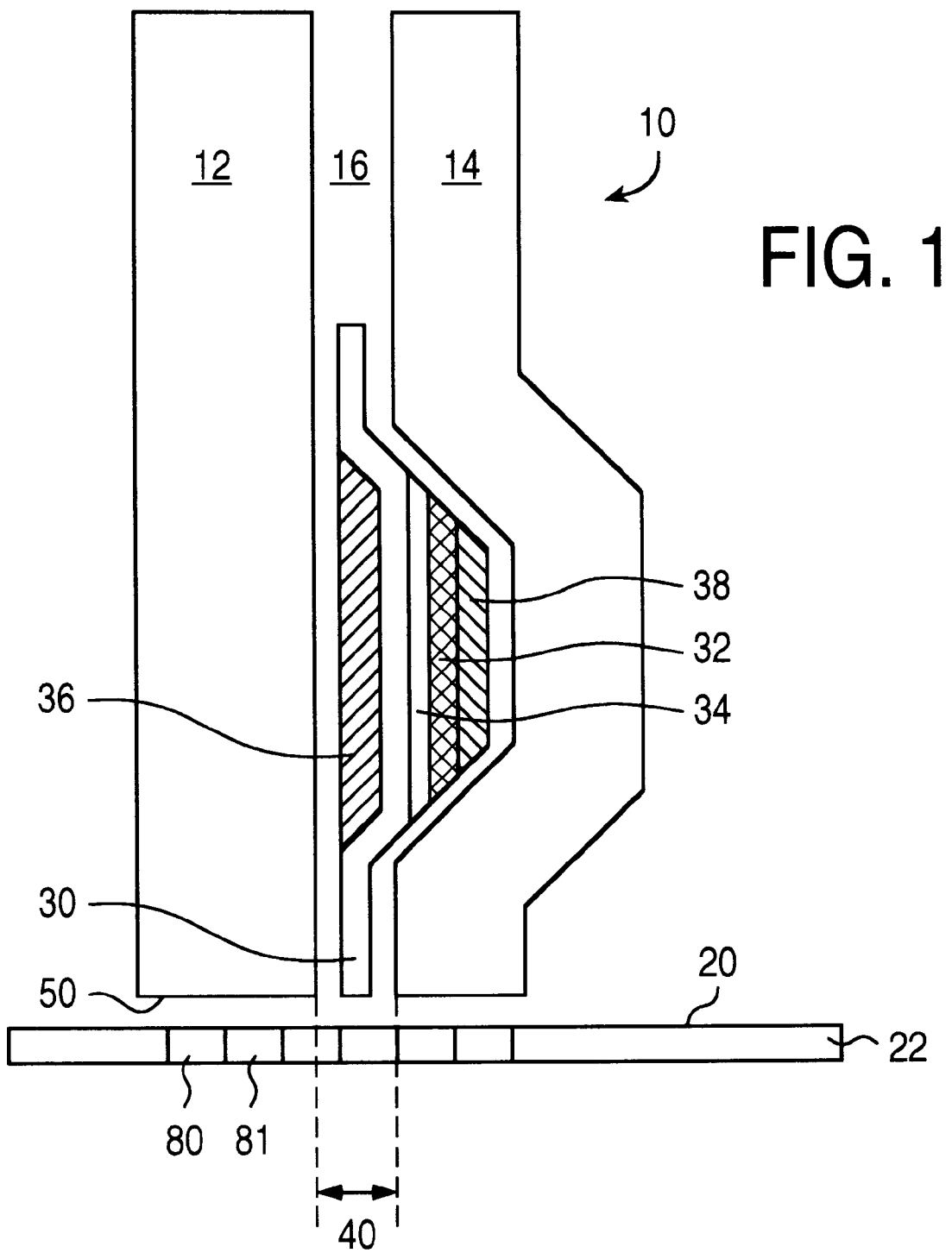
FIG. 1 shows a cross sectional view of a read portion of a recording head that provides robust operation for near contact applications to a recording media.

FIG. 1 shows a cross sectional view of a read portion of a recording head 10 suitable for near contact operation with a recording media 22. The recording head 10 is shown addressing a surface 20 of the recording media 22. This cross section is taken in a direction that traverses across a set of transitions 80–81 of the recording media 22. The recording head 10 includes a flux guide 30 that conducts magnetic flux emanating from the surface 20 of the recording media 22 upward and away from the surface 20. The flux guide 30 in combination with a pinned magnetic film 32 and an intervening dielectric barrier 34 form a spin tunneling magnetoresistive sensing element (hereinafter tunnel sensor) in the recording head 10. The tunnel sensor is encased in shields 12 and 14 of the recording head 10.

The area of the pinned magnetic film 32 that overlaps the flux guide 30 defines an active region of the tunnel sensor. The dielectric barrier 34 provides a thin tunnel barrier at the active region of the tunnel sensor. The dielectric barrier 34 in on embodiment is between 0.5 and 5 nanometers thick.

The pinned magnetic film 32 is pinned by an exchange layer (not shown) of antiferromagnetic material. The exchange layer fixes the orientation of magnetization of the pinned magnetic film 32. The orientation of the magnetization in the pinned magnetic film 32 is preferably orthogonal to the magnetization in the flux guide 30 in the active region of the tunnel sensor in order to linearize the sensing signal.

The flux guide 30 serves as one electrode of the tunnel sensor in the recording head 10 and the pinned magnetic film 32 serves as the other electrode. In one embodiment a pair of conductor layers 36 and 38 provide an electrical path for a sensing current that flows through the tunnel sensor. The conductor layer 36 reduces leakage of magnetic flux from the flux guide 30 to the shield 12 of the recording head 10. Similarly, the conductor layer 38 serves to reduce leakage of magnetic flux to the shield 14. In another embodiment, the conductor layers 36 and 38 are not present and the electrical sensing current flows directly via the flux guide 30 and the magnetic film 32.

A sense current flows through the tunnel sensor while the recording head 10 is reading the media 22. The sense current flows between the pinned magnetic film 32 and the active region of the flux guide 30 across the dielectric barrier 34. Meanwhile, the flux guide 30 conducts magnetic flux emanating from the surface 20 up to the active region of the tunnel sensor. This magnetic flux changes the orientation of the magnetization in the active region of the flux guide 30 and thereby changes the resistivity of the tunnel sensor in the active region. The changing resistivity can be sensed by an external sensing circuit (not shown) to provide a read signal from the recording head 10.

The shields 12 and 14 are spaced apart by a dielectric region 16 which extends down to a surface 50 of the recording head 10. The dielectric region 16 defines a gap width 40 in a direction along tracks of the media 22 across the transitions 80–81. The surface 50 of the recording head 10 and the surface 20 of the media 22 define a head/media interface.

The structure of the tunnel sensor in the recording head 10 makes it possible to maintain the shields 12 and 14 and the flux guide 30 at the same electrical potential. This prevents the formation of electrical short circuits between the flux guide 30 and the shields 12 and 14 at the head/media interface. In one embodiment, the shields 12 and 14 and the flux guide 30 are all maintained at ground potential while the conductor layer 36 is grounded and the conductor layer 38 has a potential different from ground potential. The greater the potential difference between ground and the conductor layer 38 the better. Generally, this potential difference is limited by the thickness of the dielectric region 16 and its breakdown voltage.

The structure of the recording head 10 allows a very thin dielectric region 16 and a very thin flux guide 30 which yields a very thin gap width 40. The dielectric region 16 can be very thin because it does not have to electrically isolate the flux guide 30 from the shields 12 and 14 due to their equal electrical potentials. The flux guide 30 can also be made very thin because it does not have to conduct sensing or bias currents along its plane. These currents flow instead across the tunnel sensor. The narrowness of the gap width 40 allows the recording head 10 to read media with high densities. Therefore the length of the transitions 80–81 of the media 22 can be very small.

The structure of the recording head 10 also prevents collisions and other ill effects at the head/media interface from affecting the efficiency of the tunnel sensor. The active region of the tunnel sensor in the recording head 10 is far enough away from the head/media interface so as not to be susceptible to collisions between the media 22 and the recording head 10. Collisions that may damage portions of the flux guide 30 near the head/media interface do not affect the active region and therefore do not substantially affect the response of the tunnel sensor to magnetic flux emanating from the surface 20 of the media 22. In addition, the thermal effects caused by collisions between the recording head 10 and the media 22 are far enough removed from the active region of the tunnel sensor to prevent thermal spikes from introducing substantial noise into the sensing current that flows through the tunnel sensor.

In addition, the active region of the tunnel sensor in the recording head 10 is isolated from corrosion that may occur at the head/media interface. Moreover, the recording head 10 does not expose the conductor layers 36 and 38 to the head/media interface. This avoids the effects caused by conductor smearing or short circuits that commonly occur in prior recording heads.

Figure 2:
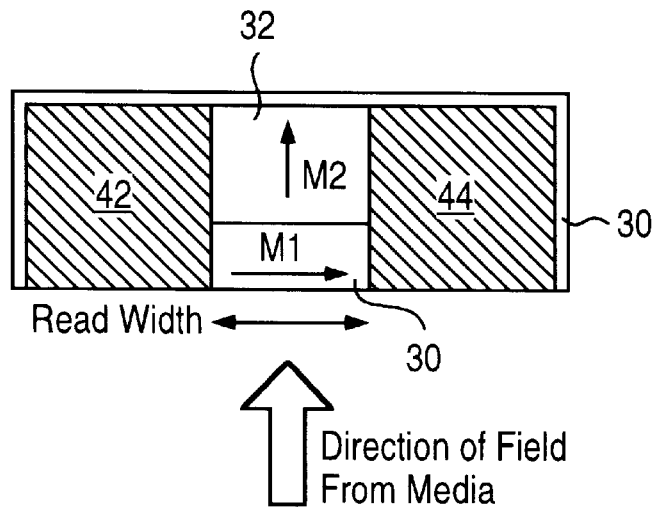
FIG. 2 shows a view of the flux guide and the pinned magnetic film taken in a direction across the tracks of the recording media.

FIG. 2 shows a view of the flux guide 30 and the pinned magnetic film 32. This cross section is taken in a direction across the tracks of the media 22 along one of the transitions 80–81. Regions 42 and 44 represent the stabilization regions of the flux guide 30. The read width for the tunnel sensor is defined by the regions of the flux guide 30 that are not pinned by the stabilization regions 42 and 44. The read width corresponds to the width of tracks on the media 22 in a dimension orthogonal to that of the transitions 80–81.

In one embodiment, the stabilization regions 42 and 44 are realized by layers of antiferromagnetic material. The antiferromagnetic material may be a manganese-based material such as iron-manganese (FeMn), nickel-manganese (NiMn), or iridium-manganese, Alternatively, the antiferromagnetic material may be nickel-oxide or terbium-iron (TbFe).

In another embodiment, the stabilization regions 42 and 44 are realized by permanent magnets.

An arrow labeled M1 shows the direction of magnetization in the active region of the flux guide 30. The direction shown for M1 is along the longest dimension of the flux guide 30 which is across the tracks of the media 22. The direction shown of M1 is set by the stabilization regions 42 and 44 and varies about the direction shown in response to magnetic flux emanating from the media 22.

An arrow labeled M2 shows the direction of magnetization in the pinned magnetic film 32. The orientation of magnetization M2 is pinned by an antiferromagnetic layer and is substantially orthogonal to M1 in the active region of the flux guide 30.

Figure 3:
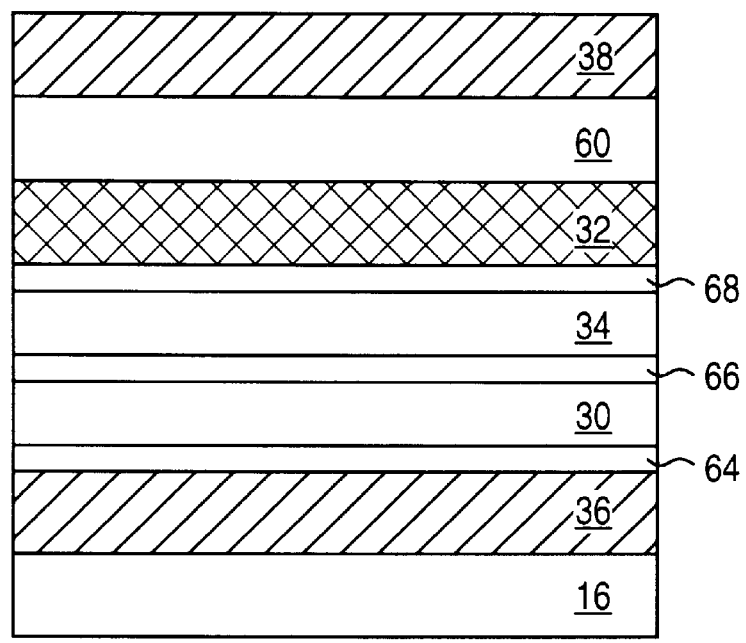
FIG. 3 is a detailed view of the layers encased in the shields of the recording head including the layers of the spin tunneling sensing element.

FIG. 3 is a detailed view in one embodiment of the layers encased in the shields 12 and 14 of the recording head 10. This view depicts the active region of the tunnel sensor. The base of the structure is a dielectric layer that provides a portion of the dielectric region 16. Next is the conductor layer 36 which is made of a conductive material such as gold. A thin layer of tantalum 64 prevents diffusion between the conductor layer 36 and the flux guide 30.

The flux guide 30 is a layer of soft magnetic film. In one embodiment, the flux guide 30 is a permalloy layer such as nickel-iron. A pair of thin iron layers 66 and 68, which in one embodiment are each 20 Å thick, are used at the interfaces between the dielectric barrier 34 and the layers 30 and 32.

The dielectric barrier 34 is a layer of dielectric material. In one embodiment, the dielectric barrier is a layer of aluminum-oxide ($Al_2O_3$).

The pinned magnetic film 32 is a layer of soft magnetic film. In one embodiment, the pinned magnetic film 32 is a permalloy layer such as nickel-iron.

The orientation of the magnetization in the pinned magnetic film 32 is pinned by an antiferromagnetic layer 60. In one embodiment, the antiferromagnetic layer 60 is a layer of manganese-based material such as iron-manganese (FeMn), nickel-manganese (NiMn), or iridium-manganese, Alternatively, the antiferromagnetic layer 60 may be a layer of nickel-oxide or terbium-iron (TbFe).

On top of the antiferromagnetic layer 60 is the conductor layer 38 which may be tantalum or tantalum/gold.

The direction of magnetization M1 in the flux guide 30 at the head/media interface allows magnetic flux to be conducted directly into the flux guide 30 and eliminates the need for biasing structures and methods for reducing cross-track asymmetry. In addition, the total power consumption of the recording head 10 is relatively low because a tunnel sensor is a relatively high impedance structure. A low power consumption recording head may be useful for tape heads in which many parallel channels may exist.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A recording head having a spin tunneling sensing element which is integral with and spaced apart from an interface between the recording head and a recording media, the spin tunneling sensing element having a magnetic element that functions as a flux guide to conduct magnetic flux emanating from the recording media away from the interface to an active area of the spin tunneling sensing element.

2. The recording head of claim 1, wherein the flux guide is coupled to a pair of stabilization regions that set an orientation of magnetization in the flux guide.

3. The recording head of claim 2, wherein an area of the flux guide not coupled to the stabilization regions defines the active area.

4. The recording head of claim 2, wherein the stabilization regions comprise an antiferromagnetic material.

5. The recording head of claim 2, wherein the stabilization regions comprise a pair of permanent magnets.

6. The recording head of claim 2, wherein the spin tunneling sensing element further comprises a pinned magnetic film and an intervening dielectric barrier.

7. The recording head of claim 6, wherein the pinned magnetic film has an orientation of magnetization that is substantially perpendicular to the orientation in the flux guide.

8. The recording head of claim 6, wherein the pinned magnetic film includes a soft magnetic film coupled to layer of antiferromagnetic material.

9. The recording head of claim 8, wherein the soft magnetic film comprises a permalloy layer.

10. The recording head of claim 8, wherein the soft magnetic film comprises a layer of nickel-iron.

11. The recording head of claim 8, wherein the antiferromagnetic material is a manganese-base material.

12. The recording head of claim 8, wherein the antiferromagnetic material is nickel-oxide.

13. The recording head of claim 8, wherein the antiferromagnetic material is terbium-iron.

14. The recording head of claim 1, wherein the spin tunneling sensing element is encased in a shield which is maintained at a predetermined electrical potential and the flux guide is maintained at the predetermined electrical potential to prevent short circuits between the flux guide and the shield.

15. The recording head of claim 1, wherein the flux guide comprises a soft magnetic film.

16. The recording head of claim 1, wherein the flux guide comprises a permalloy layer.

17. The recording head of claim 1, wherein the flux guide comprises a layer of nickel-iron.

18. The recording head of claim 1, further comprising a pair of conductor layers that provide electrical connection to the spin tunneling sensing element such that the conductor layers are separated from the interface to prevent short circuits between the recording media and the recording head.

* * * * *